United States Patent [19]

Lewis et al.

[11] Patent Number: 5,075,090

[45] Date of Patent: Dec. 24, 1991

[54] PROCESS FOR PREPARING SMALL PARTICLE SIZE MIXED METAL OXIDES

[75] Inventors: Duane J. Lewis; Galen K. Madderra, both of Ponca City, Okla.

[73] Assignee: Vista Chemical Company, Houston, Tex.

[21] Appl. No.: 434,519

[22] Filed: Nov. 13, 1989

Related U.S. Application Data

[63] Continuation of Ser. No. 143,363, Jan. 12, 1988, abandoned.

[51] Int. Cl.$^5$ .............................................. C01B 13/34
[52] U.S. Cl. ...................................... 423/337; 423/600
[58] Field of Search ..................... 423/625, 337, 600

[56] References Cited

U.S. PATENT DOCUMENTS

| | | | |
|---|---|---|---|
| 4,065,544 | 12/1977 | Hamling et al. | 423/625 |
| 4,455,289 | 6/1984 | Poe et al. | 423/630 |
| 4,529,579 | 7/1985 | Raahauge | 423/625 |
| 4,610,857 | 9/1986 | Ogawa et al. | 423/625 |
| 4,744,974 | 5/1988 | Lewis et al. | 423/625 |

FOREIGN PATENT DOCUMENTS

2166126A 4/1986 United Kingdom .

OTHER PUBLICATIONS

Grant and Hackh's Chemical Dictionary, 5th Edition, McGraw-Hill, N.Y., 1987, page 147.
"Chemistry's New Workhorse", *High Technology*, Jul. 1987.
"Preparation of Very Pure, Finely Divided Aluminum Oxide from Triethyl Aluminum", by K. H. Thiele, W. Schwartz and L. Dettmann, *Z. Anorg. Allgem. Chem.*, 349; 324–327 (1967).
"Fine $Si_3N_4$ and SiC Powders Prepared by Vapor Phase Hydrolysis", presented at Conference on Ceramic Powder Science and Technology, Boston, Mass., Aug. 3–6, 1986.

*Primary Examiner*—Melvyn J. Andrews
*Attorney, Agent, or Firm*—Browning, Bushman, Anderson & Brookhart

[57] ABSTRACT

A process for preparing a particulate metal oxide of small particle size wherein a combustible organometallic compound alone or in admixture with a combustible organic liquid carrier is introduced into a combustion zone and combusted in a combustion supporting gas to produce particles of metal oxide, the combustion being carried out under reaction conditions so as to effect calcination of the metal oxide particles prior to condensation of the particles in the bulk phase.

8 Claims, 1 Drawing Sheet

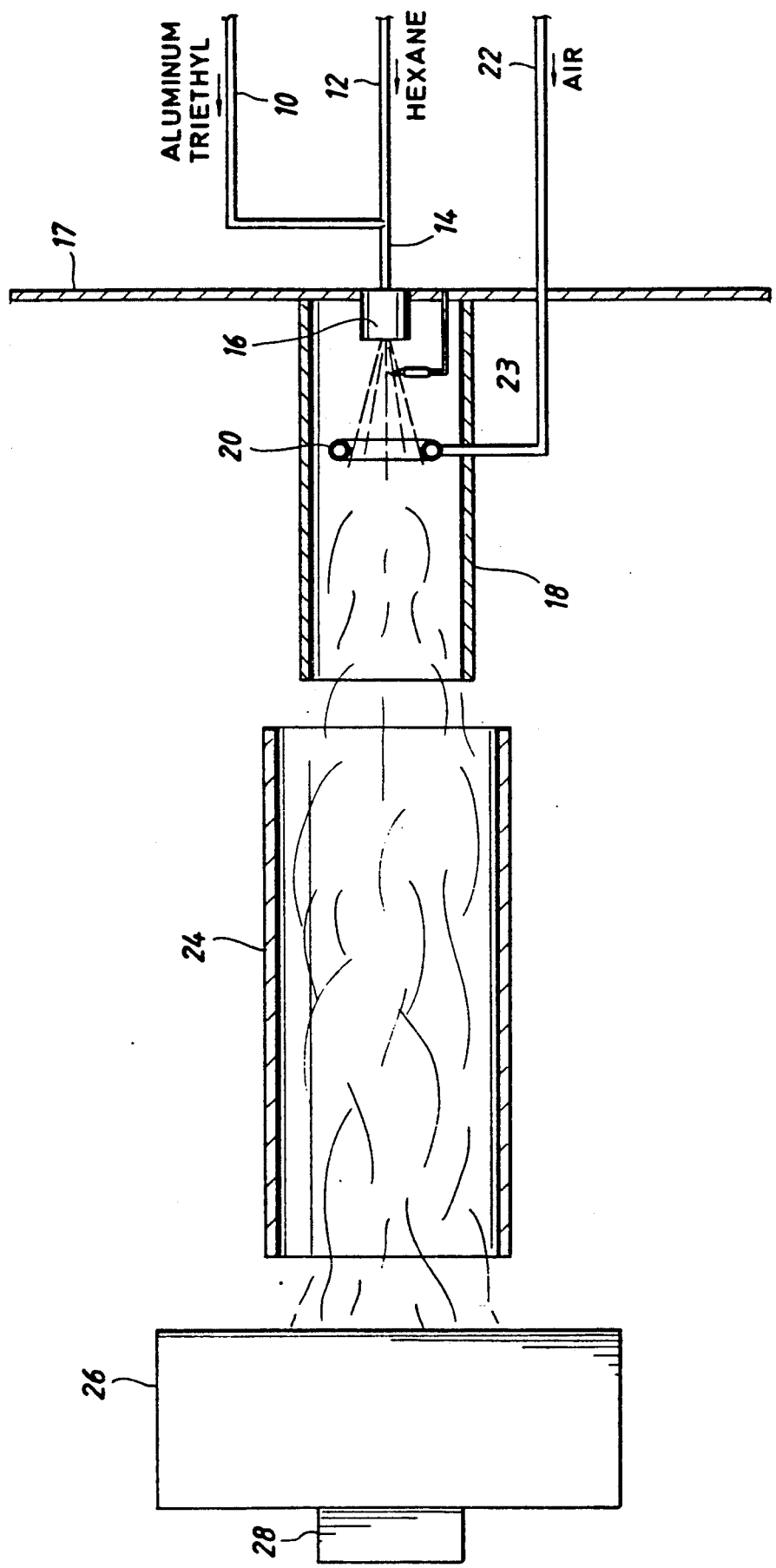

PROCESS FOR PREPARING SMALL PARTICLE SIZE MIXED METAL OXIDES

This is a continuation of co-pending U.S. Application Ser. No. 07/143,363 filed on Jan. 12, 1988, now abandoned.

Background of the Invention

1. Field of the Invention

The present invention relates to the preparation of metal oxides and, more particularly, to the preparation of particulate metal oxides of extremely small particle size.

2. Description of the Background

Ceramics have found widespread use in virtually all phases of modern technology. They find use as abrasives, in making cutting tools, as heat shields and electrical insulators and in such high tech uses as computers and telecommunications. They are virtually impervious to attack by heat or chemicals and can be made in a wide variety of forms depending on their intended end use. Although ceramics are virtually unparalleled in their ability to withstand heat and chemical attack, structurally, they suffer from the fact that they are brittle with the result that they are easily susceptible to cracking and breaking. It is known that imperfections in the microstructure of ceramics serve as starting points for cracks. Accordingly, as new high tech ceramics are developed, there is increasing emphasis to develop processing techniques and material for forming ceramics which will minimize the imperfections in the microstructure.

It is known that the minute imperfections leading to cracks in ceramics can be minimized if the raw material powder used to form the ceramic is of very high purity and extremely small particle size. High purity, fine powders permit tight packing meaning that the sintered product will have less voids, agglomerations and chemical impurities, all of which can form sites from which cracks can originate.

Metal oxide powders, particularly alumina, also find widespread use as catalysts and catalyst supports in the chemical and refining industries.

Conventional methods of preparing small particle size powders, such as, for example, alumina, include the grinding of larger particles to the desired size or forming the particle in the vapor phase by so-called fuming techniques. Additionally, as taught in "Chemistry's New Workhorse", *High Technology* July 1987, small particle sizes of high purity can be obtained by sol-gel techniques wherein the very fine particles of the metal oxide are precipitated from a liquid phase.

In a process described in "Preparation of Very Pure, Finely Divided Aluminum Oxide From Triethyl Aluminum" by K. H. Thiele, W. Schwartz and L. Dettmann, *Z. Anorg. Allgem. Chem.*, 349; 324–327 (967), triethyl aluminum is conducted into an oxyhydrogen flame to convert the triethyl alumina to particles of aluminum oxide. This procedure requires that the triethyl aluminum be vaporized and mixed with a hydrogen stream.

U.K. Patent Application 2,166,126A discloses a process for producing ceramic powders in which at least one substance which will hydrolyze to produce the metallic or non-metallic oxide, hydroxide or hydrate is sprayed and hydrolyzed, in the presence of water, the hydrolyzed material then being introduced into a calcining zone to calcine the hydrolysis product.

An article entitled "Fine $Si_3N_4$ and SiC Powders Prepared by Vapor Phase Hydrolysis" presented at the Conference on Ceramic Powder Science and Technology, Boston, Mass., Aug. 3–6, 1986, discloses the preparation of silicon nitride and silicon carbide powders by the vapor-phase pyrolysis of tris (dimethylamino) silane in an inductively heated alumina tube reactor.

SUMMARY OF THE INVENTION

It is therefore an object of the present invention to provide a process for preparing metal oxides having small particle size.

Another object of the present invention is to provide a process for producing mixtures of particulate metal oxides of small particle size.

Yet another object of the present invention is to provide a process for the formation and calcination of metal oxides in a single step.

The above and other objects of the present invention will become apparent from the description given herein and the appended claims.

In the process of the present invention, a combustible organometallic compound, in liquid form or dissolved or uniformly suspended in a combustible organic liquid carrier, forms a feed stream. The feed stream containing the pure or dispersed or solublized organometallic compound is atomized into a combustion zone, admixed with a combustion supporting gas and ignited such that the organometallic compound is combusted to particles of the corresponding metal oxide. The combustion is carried out at a temperature such that the particles of the metal oxide are calcined prior to collecting or agglomerating in a bulk phase.

BRIEF DESCRIPTION OF THE DRAWINGS

The single FIGURE is a schematic representation of an apparatus for carrying out the process of the present invention.

DESCRIPTION OF THE PREFERRED EMBODIMENT

The process of the present invention is applicable to the preparation of a wide variety of small particle size, i.e. less than about 1 micron, preferably less than about 0.5 micron, metal oxides. The starting material for the process is any combustible organometallic compound. The term "combustible," as applied to the organometallic compounds, refers to such a compound which will burn in the presence of a combustion supporting gas to form the corresponding metal oxide. Non-limiting types of organo moities forming the organometallic compound can include alkyls, alkoxides, mixed alkyl-alkoxides, alkyl-hydrides, alkoxide-hydrides, halo alkyls, etc. Generally speaking, the organometallic compounds useful in the present invention are represented by the general formula:

$$M(R)_n$$

wherein M is selected from the class consisting of aluminum, titanium, zirconium, lanthium, magnesium, manganese, vanadium, copper, cobalt, silicon, gallium, nickel, strontium, tantalum, thallium, tin, potassium, yttrium, antimony, arsenic and cerium, wherein each R is, independently, hydrogen, alkyl groups containing from 1 to 20 carbon atoms, alkoxide groups containing from 1 to 20 carbon atoms, or halogen, and wherein n is 1, 2, 3 or 4 depending on the valence of the metal. The above listed metals are known to form metal alkyls and/or alkoxides which can be combusted in the presence of a combustion supporting gas to form the corresponding metal oxide.

Representative but not exhaustive examples of suitable organometallic compounds include triethyl aluminum, diethyl aluminum hydride, diethyl aluminum chloride, diethyl aluminum fluoride, triethyl aluminum, tetraethyl zirconium, diethyl zirconium dichloride, triethyl titanium chloride, tetraethyl titanium, silicon tetraethoxide, diethyl diethoxy silicon, silicon tetraethyl, dimethyl, dichloro silicon, dimethyl, ethyl aluminum, tetramethyl titanium, dimethyl diethyl titanium, trimethyl indium, triethyl thallium, tetramethyl zirconium, etc. Preferred are the organometallic compounds wherein the R groups are alkyl, alkkoxide or mixed alkyl, alkoxides, especially when the alkyl or alkoxide groups have from 1 to about 6 carbon atoms. Especially preferred are organoaluminum compounds such as the aluminum trialkyls and/or alkoxides wherein the alkyl and/or alkoxide groups have from 1 to 6 carbon atoms.

While the pure organometallic compound in liquid form can be used to form the feed stream or mixture, it is preferred that the organometallic compound be dissolved or dispersed in a combustible organic liquid carrier. While preferably the liquid carrier is of a type in which the organometallic compound is soluble, it is only necessary that a uniform mixture of the liquid carrier and the organometallic compound be achieved. Thus, the term "solution" as used herein, encompasses true solutions as well as mixtures of the liquid carrier and the organometallic compound in which the organometallic compound is homogenously dispersed in the liquid carrier such that there are formed discrete droplets of the organometallic compound which are uniformly distributed throughout the liquid carrier. A wide variety of organic liquids can be chosen as the liquid carrier. Virtually any liquid organic compound which is combustible in the presence of a combustion supporting gas, which does not react with the organometallic compound and which does not form combustion products which will react with the organometallic compound or the metal oxides formed therefrom can be employed. Preferably, however, the liquid carrier will be a liquid hydrocarbon, especially a liquid alkane or mixture of liquid alkanes, non-limiting examples including alkanes having from 5 to 10 carbon atoms, diesel-oil, kerosene, etc. It is also possible to use liquid aromatic hydrocarbons such as benzene, toluene, etc. It will be readily apparent that mixtures of such liquid hydrocarbons can also be employed to accommodate differences in solubilities of the various organometallic compounds, combustion temperatures and the like. It is also possible to employ oxygen containing organic liquids such as alcohols, ethers, ketones, etc. provided that such liquids are combustible, do not react with the organometallic compounds prior to or during combustion and do not react with the metal oxides formed in the combustion reaction. Thus, non-limiting examples of oxygen containing organic compounds which can be used in forming the liquid carrier include aliphatic alcohols having from 1 to 10 carbon atoms, ketones having from 2 to 10 carbon atoms, ethers having from 2 to 10 carbon atoms and mixtures thereof.

The concentration of the organometallic compound in the combustible organic liquid can be varied over wide limits so long as the mixture is uniform as described above. It will be appreciated that by varying the individual concentrations of the organometallic compounds when several are employed, homogenous mixed oxides can be tailored to contain desired concentrations of particular metal oxides. Generally speaking, the organometallic compound, when admixed with a combustible organic liquid, will be present in the organic liquid in an amount ranging from about 0.1% up to the solubility limit of the organometallic compound.

The feed stream or mixture comprised of the liquid organometallic compound or the liquid carrier and the organometallic compound dissolved therein is introduced under pressure through a nozzle or the like into a suitable combustion zone, thereby effecting atomization of the feed. The atomization is such as to form a fog or extremely fine mist comprised of discrete droplets of the feed stream. In the combustion or reaction zone, the atomized feed is admixed with a combustion supporting gas such as air, pure oxygen, etc., which can also be introduced under pressure into the combustion zone, and ignited. It is preferable, to ensure small particle size, to ignite the feed mixture before any coalescence of the fog or mist particles occurs.

Ignition of the feed and combustion supporting gas in the combustion zone results in the organometallic compound rapidly being converted to particles of the corresponding metal oxide. Reaction parameters such as flow rates and particularly temperature in the combustion zone, are controlled so as to ensure that calcination of the individual metal oxide particles occurs prior to any condensing or coalescing thereof in the bulk phase. Thus, the temperature in the combustion zone will range from about 500° C. to about 2000° C., depending upon the metal oxide being prepared. It will be apparent that the combustion temperature can be controlled by adjusting the relative feed rates of the feed mixture and the combustion supporting gas or which can vary widely. However, in general, the feed rate of the feed mixture will be such as to ensure a high flow rate of exhaust products from the combustion zone. Such conditions, together with sufficiently high temperatures, ensure that the discrete particles of metal oxide are calcined prior to any agglomeration or aggregation, i.e. condensation to the bulk phase.

The calcined metal oxide particles can be collected in conventional fashion using conventional methods of separating entrained solids from gases such as by means of filtering, electrostatic precipitation, cyclone separators or wet scrubbing.

The process, as noted, is also ideally suited for the manufacture of high purity, calcined mixed oxides of small particle size. Thus, by using two or more organometallic compounds in forming the feed mixture, it is possible to form highly homogeneous, calcined mixed metal oxides of small particle size.

To more fully describe the process, reference is made to the accompanying FIGURE. Although the process will be described with particular reference to the use of aluminum triethyl and dimethyldimethoxy silane as the organometallic compounds, it will be understood that such is by way of example only and that, as noted above, numerous organometallic compounds or mixtures thereof can be employed. Referring then to the FIGURE, the organometallic compound, as for example aluminum triethyl dissolved in a suitable combustible solvent, if desired, in line 10 admixes with a hexane stream in line 12, the combined streams of aluminum triethyl and hexane passing as a homogeneous solution via line 14 into a nozzle assembly 16. It will be understood that the aluminum triethyl and the hexane are being pumped into the system under sufficient pressure such that when the solution enters nozzle assembly 16, it is ejected under substantial pressure. Nozzle assembly 16 is also designed such that the solution is atomized so as to form a fine fog or mist comprised of minute droplets of the hexane/aluminum triethyl-solvent solution. Nozzle assembly 16, which is mounted behind a heat shield 17, is disposed in a reaction or combustion chamber 18 which also houses a perforated distributor ring 20. Air, oxygen or some other combustion supporting gas is introduced into distributor ring 20 via line 22. A small pilot flame assembly 23 serves to ignite the combustible mixture of hexane, aluminum triethyl, solvent and air internally of combustion chamber 18. The exhaust from reactor 18 comprising combustion gases and aluminum oxide produced by combustion of the aluminum triethyl is directed out of reactor 18 into an elongate cooling tube 24. Exhaust from cooling tube 24 enters an electrostatic precipitator 26 where the solid aluminum oxide is collected in conventional manner, the gaseous material being vented via vent 28.

It will be appreciated that once ignited, the aluminum triethyl/hexane mixture continues to burn as a jet like flame in reactor 18, the combustion reaction under which aluminum triethyl is converted to aluminum oxide occurring very rapidly forming a metal oxide "smoke" comprised of combustion products and metal oxide particulate. By controlling the relative feed rates of the aluminum triethyl/hexane solution and the combustible gas, the temperature of the flame and degree of oxidation can be varied. Depending on the type of organometallic compounds being employed, the temperature of the flame is maintained so as to effect calcination of the individual particles of the metallic oxide as they are formed in the combustion reaction. Moreover, because of the speed of the reaction and the large amounts of heat and gases generated, the gasous products move at high velocities creating high turbulence in the combustion zone with the result that the individual metal oxide particles are effectively prevented from contacting each other and agglomerating or aggregating. Thus, by ensuring sufficiently high temperature, depending upon the metal oxide being produced, the individual particles of metal oxide are calcined as soon as they are formed by the combustion of the organometallic compound. It will be recognized that by controlling feed rates of the combustion supporting gas in the feed mixture comprised of the organometallic compound and the combustible organic solvent, the temperature of the flame can be easily controlled, thus ensuring that the temperature necessary to effect calcination of the respective metal oxide(s) can be achieved.

As noted, the metal oxide smoke produced by the process of the present invention can be collected by means of filtering, electrostatic precipitation, cyclone separators or wet scrubbing, wherein the exhaust comprised of combustion products and metal oxide particles are passed through a suitable liquid scrubbing medium.

To more fully illustrate the present invention, the following non-limiting examples are employed.

EXAMPLE 1

An assembly similar to that shown in the FIGURE was employed. The reaction tube consisted of a pipe 4" in diameter, 10" long and open only on the discharge end. The cooling tube was comprised of a stainless steel 6" diameter pipe, 5' long. The run was begun by feeding hexane through the nozzle assembly along with air injection. Air flow rate was adjusted until the flame became clear blue in color. At this point, a feed mixture comprising 50% by weight aluminum triethyl and 50% by weight kerosene was introduced into the hexane stream. It was observed that the blue flame turned to a bright white/yellow color. The reaction temperature measured at the outlet of the reactor tube varied from 850° C. to 1000° C. Product aluminum oxide collected as a dry powder on the walls of the cooling tube. Additional product was collected by water scrubbing exhaust from the cooling tube by wet scrubbing to produce a slurry. The alumina was removed from the slurry by evaporating off of the water and analyzed.

EXAMPLE 2

The procedure of Example 1 was carried out with the exception that the reactor tube was 24" long rather than 10" long. In addition, oxygen in pure form rather than air was supplied. During the run, the temperature at the burner outlet varied from 1200° C. to 1360° C. The reaction flame was an extremely bright white color. Product was collected as a slurry via wet scrubbing of the exhaust from the cooling tube and analyzed for particle size. It was found that due to the small particle size of the alumina, it could not be recovered from the slurry by filtration or centrifugation. Accordingly, the alumina slurry was flocculated by adjusting the pH of the slurry to approximately 10 by the addition of ammonium hydroxide followed by filtering and drying the wet cake. The dried cake was analyzed for carbon content and particle size.

EXAMPLE 3

The procedure of Example 2 was followed with the exception that a slightly higher feed rate of aluminum triethyl was employed. Again, pure oxygen was employed instead of air. During the run, the temperature at the outlet of the reactor tube varied from 1100° C. to 1300° C. The product was collected via wet scrubbing of the exhaust from the cooling tube. The particle size of the alumina in the slurry was determined and the alumina was then recovered from the slurry by flocculating, filtering, then drying. The dried cake was analyzed for carbon content.

EXAMPLE 4

The procedure of Example 2 was carried out with the exception that the reaction conditions were adjusted so that the burner temperature was lowered to 750° C. to 850° C. via excess air injection. The aluminum triethyl concentration was reduced to 23% by weight by dilution of the aluminum triethyl/kerosene solution with hexane. The dry powder which coated the inside of the cooling tube was collected and analyzed.

The analyses performed on the alumina produced in the above example is summarized in the table below. The crystalline form of the alumina was determined by X-ray diffraction analysis. The particle size of the alumina contained in a slurry was determined by analyzing a diluted sample using a Coulter Counter Model N4 submicron particle size analyzer. The particle size of the dry powder (collected as dry powder or dried from slurry wet cake) was determined by placing a small portion in distilled water and shaking the sample to disperse the alumina. The particle size was then analyzed with a Coulter Counter Model N4. Carbon content of the samples was determined by combustion in $CO_2$ and analyzing in a LECO carbon analyzer.

TABLE

| Sample Description | Crystalline Phase | Particle Size | Carbon Content |
|---|---|---|---|
| Example 1 (Powder) | Delta | 0.22 microns | |
| Example 1 (Dried Slurry) | Delta | 0.31 microns | |
| Example 2 (Slurry) | Delta | 0.20 microns | |
| Example 2 (Flocculated/Dry Slurry) | Delta | 0.31 microns | 0.294% |
| Example 3 (Slurry) | Delta | 0.22 microns | |
| Example 3 (Flocculated/Dry Slurry) | Delta | 0.27 microns | 0.240% |
| Example 4 (Powder) | Gamma | | 3.2% |

As can be seen from the above data, using the process of the present invention, metal oxides, specifically alumina, of extremely small submicron particle size, i.e. less than 0.5 microns can be produced. Also, the metal oxide produced is in a crystalline form normally achieved only by calcining.

EXAMPLE 5

A hexane solution of aluminum triethyl (about 65% aluminum triethyl) and dimethyldimethoxy silane was prepared such that the metallic silicon to metallic aluminum ratio was 0.34/1. This is the silicon to aluminum ratio reported in the literature for mullite (a silica/alumina mixed oxide). The mixed organometallic feed was run in an apparatus similar to that described in Example 2, except that the combustion tube was replaced with a well insulated combustion chamber of larger dimensions. This allowed longer residence time in the high temperature combustion zone. The reaction was run using oxygen injection. Temperature in the combustion chamber was maintained between 1100° C. and 1200° C. throughout the run. Product was collected as a dry powder in the electrostatic precipitator. X-ray analysis of the resulting product showed that it was mostly amorphous with some presence of mullite. A sample of the product was then calcined in a laboratory furnace at 1650° C. for one hour. X-ray analysis of the calcined produce showed it to contain essentially pure mullite with no measurable quantity of free alumina or silica crystals. It is believed that the amorphous material in the uncalcined product is either extremely small crystallite sized mullite or is a mullite precursor phase. The example shows that mixed oxides can be obtained by the method of the present invention but that the combustion must be conducted at a temperature, i.e. 1650° C. in the case, sufficient to result in calcination of the oxide as it is formed.

The foregoing disclosure and description of the invention is illustrative and explanatory thereof, and various changes in the method steps may be made within the scope of the appended claims without departing from the spirit of the invention.

What is claimed is:

1. A process for preparing a particulate mixed oxide comprising:

providing a combustible liquid, feed stream containing at least two combustible compounds selected from the group consisting of organometallic compounds and organo silicon compounds, which will burn in the presence of a combustion supporting gas to form the corresponding mixed oxide of said compounds;

atomizing said feed stream in a combustion zone in the presence of a combustion supporting gas;

igniting said atomized feed stream and said combustion supporting gas in said combustion zone to effect combustion of said compounds and produce discrete, submicron size, unagglomerated particles of said mixed oxide, said combustion of said compounds being conducted at temperatures to effect calcination of said particles of said mixed oxide prior to said particles condensing to a bulk phase; and collecting said calcined particles of said mixed oxide.

2. The process of claim 1 wherein said organometallic compound is selected from the group consisting of compounds having the general formula:

$$M(R)_n$$

wherein M is selected from the group consisting of aluminum, titanium, zirconium, lanthium, lithium, magnesium, manganese, vanadium, copper, cobalt, gallium, nickel, strontium, tantalum, thallium, tin, potassium, yttrium, antimony, arsenic and cerium, wherein each R is, independently, hydrogen, an alkyl group containing from 1 to 20 carbon atoms, an alkoxide group containing from 1 to 20 carbon atoms and halogen, wherein at least one R must be alkyl or alkoxide and n is 1 to 4 depending on the valence of M.

3. The process of claim 2 wherein said organometallic compound comprises an aluminum trialkyl.

4. The process of claim 3 wherein said aluminum trialkyl comprises aluminum triethyl.

5. The process of claim 1 wherein said combustion is carried out at a temperature of from about 500° C. to about 2000° C.

6. The process of claim 1 wherein said feed stream includes a combustible organic liquid.

7. The process of claim 6 wherein said organic liquid comprises a liquid hydrocarbon.

8. The process of claim 7 wherein said liquid hydrocarbon comprises an alkane having from 5 to 10 carbon atoms.

* * * * *